United States Patent
Choiniere et al.

(10) Patent No.: US 8,989,444 B2
(45) Date of Patent: Mar. 24, 2015

(54) SCENE CORRELATION (71) Applicant: BAE Systems Information and Electronic Systems Integration Inc., Nashua, NH (US)

(72) Inventors: Michael J. Choiniere, Merrimack, NH (US); Brian F. O'Donnell, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 57 days.

(21) Appl. No.: 14/045,053

(22) Filed: Oct. 3, 2013

(65) Prior Publication Data

US 2014/0185869 A1 Jul. 3, 2014

Related U.S. Application Data (60) Provisional application No. 61/744,778, filed on Oct. 3, 2012.

(51) Int. Cl.
*G06K 9/00* (2006.01)
*G01C 21/16* (2006.01)
*G09G 5/00* (2006.01)

(52) U.S. Cl.
CPC .................................... *G01C 21/16* (2013.01)
USPC ........................... 382/103; 382/291; 345/633

(58) Field of Classification Search
USPC ......... 382/100, 103, 106–107, 155, 162, 168, 382/173, 181, 199, 209, 221, 232, 254, 274, 382/276, 291, 305, 312, 321; 33/534; 709/204; 463/4; 348/36; 345/158, 633
See application file for complete search history.

(56) References Cited

U.S. PATENT DOCUMENTS

| | | | |
|---|---|---|---|
| 8,896,534 B2 * | 11/2014 | Takeda et al. | 345/158 |
| 2012/0236029 A1 * | 9/2012 | Newhouse et al. | 345/633 |
| 2012/0262540 A1 * | 10/2012 | Rondinelli et al. | 348/36 |
| 2013/0091719 A1 * | 4/2013 | Hohl et al. | 33/534 |
| 2013/0178257 A1 * | 7/2013 | Langseth | 463/4 |
| 2013/0339433 A1 * | 12/2013 | Li et al. | 709/204 |

* cited by examiner

*Primary Examiner* — Seyed Azarian
(74) *Attorney, Agent, or Firm* — Daniel J. Long (57) ABSTRACT

A method for maintaining north comprising the steps of locating north with a north finding gyroscope, tying north to a feature in a scene, correlating the feature to a target in the field of regard of a plurality of cameras, and determining a north factor and translating the north factor into a target vector relative to north.

1 Claim, 12 Drawing Sheets

SCENE CORRELATION

CROSS-REFERENCE TO RELATED APPLICATIONS

This Application claims rights under 35 USC §119(e) from U.S. Application Ser. No. 61/744,778 filed Oct. 3, 2012, and is related to application Ser. No. 61/660,117 filed Jun. 15, 2012 and entitled "MODULAR AVAM WITH OPTICAL AUTOMATIC ATTITUDE MEASUREMENT" and application Ser. No. 61/703,405 filed Sep. 20, 2012 and entitled "RATE AIDED IMAGE REGISTRATION", both of which are assignable to the assignee to this application and are incorporated herein by reference. This application is also related to application Ser. No. 14/045,068 entitled "AUTO CORRELATION BETWEEN CAMERA BANDS" and application Ser. No. 14/045,073 entitled "STACKING CONNECTOR FOR MILITARY APPLICATIONS", both of which are filed on even date herewith and are assignable to the assignee of this application and are incorporated here by reference.

BACKGROUND OF THE INVENTION

1. Field of the Invention

The present invention relates to optical systems and more particularly to targeting systems for military applications.

2. Brief Description of Related Art

In the prior art scene correlation is used to help solve the north keeping problem. That is, a way of finding north and keeping north for a period of time is needed so that the direction may be effective for targeting systems.

When using a prior art targeting system, the maintenance of north over time may become very difficult because most gyroscopes do not have the ability to retain north and they tend to have a high bias drift.

Typically, such gyroscopes may find north after about two minutes of integration time, but they may have a problem keeping north for more than two or three minutes. Consequently, after every two or three minutes the user may have to put the gyroscope back on the ground and find north yet again. As a result, the north vector looses accuracy over time. With the current state of the art, there may often be about 5 minutes before the user has to re-calibrate the north finder,

SUMMARY OF THE INVENTION

The present invention is a scene correlation method for maintaining north. What scene correlation does is that once north is located with the north finding gyroscope, the user then simply takes the north coordinate and ties it to a feature in the scene. That reference scene then can be utilized to determine a targets position relative to the north vector. The scene correlation provides pixel accuracy when comparing target imagery and reference imagery.

The reference scene can be a single picture within the engagement area or a complete panoramic view of the engagement area. In the case of single picture, an inertial measurement unit (IMU) is used to measure the azimuth and elevation angle swing from the target to the general location of the reference image. Scene correlation is then used to determine the operator error of repositioning the reference image in the viewer's crosshairs.

In the case of the panoramic, the entire engagement scene is calibrated to the north vector; thereby scene correction simply needs to determine the optimum correlation to find the target direction relative to north.

This method allows generating a scene feature such as buildings, roads, tree line, mountain rocks, any man-made structure or nature terrain and can generate a reference image. That reference image is then tied to North vector by using any north finding means such as a gyroscope, celestial or any known geo reference feature, etc. Once the reference is generated, imagery can maps the changes elevation and azimuth when using the camera as a surveying tool. If the operator does not move from their position, the north vector can be maintained almost indefinitely since the scene is not moving.

BRIEF DESCRIPTION OF THE DRAWINGS

The present invention is further described with reference to the accompanying drawings wherein.

DETAILED DESCRIPTION OF THE INVENTION

Figure 1:
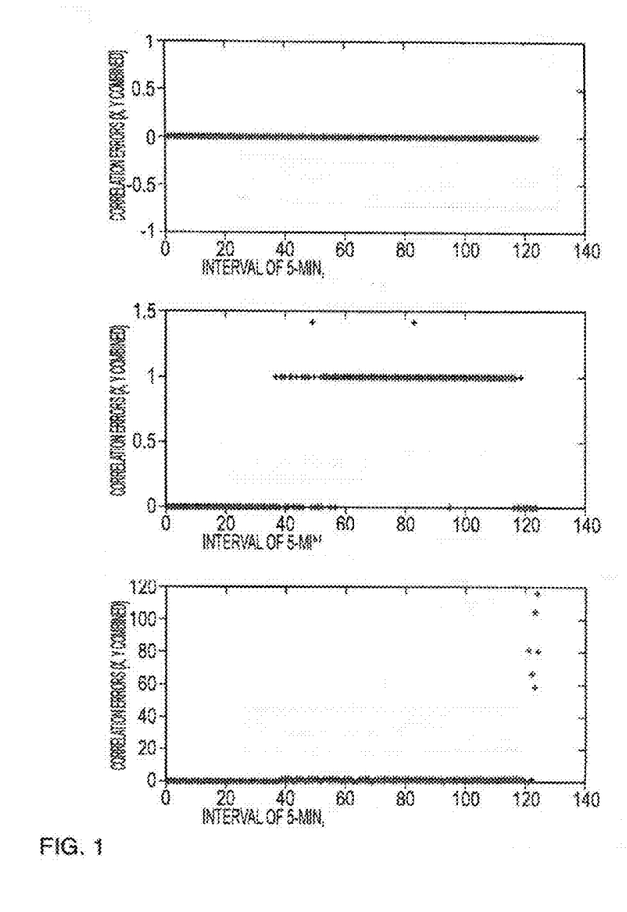
FIGS. 1-12 comprises a series of reference frames with related data demonstrating a preferred embodiment of the method of the present invention.

Referring to FIG. 1, it will be understood that one issue relating to scene correlation is that as the sun changes angles in the sky so the user has shadows in the field of view and lighting conditions change throughout the day. The apparent nature of the scene and the question becomes whether the user still maintain a correlation to the scene taking into account different sun conditions under different weather conditions. In FIG. 1 looking at long waves, we took frames of data every fifteen minutes and we made comparisons between them before the sunrise frame throughout the day until past sunset, and what we show is that on the long wave infrared radiation (LWIR) we had perfect correlation within about one to two pixels as well as wave infrared radiation (SWIR) camera is one to one and a half pixels and the day camera is practically perfect. So as a result, we held scene correlation within the desired tolerance which is typically less than 300 urads.

Figure 2:
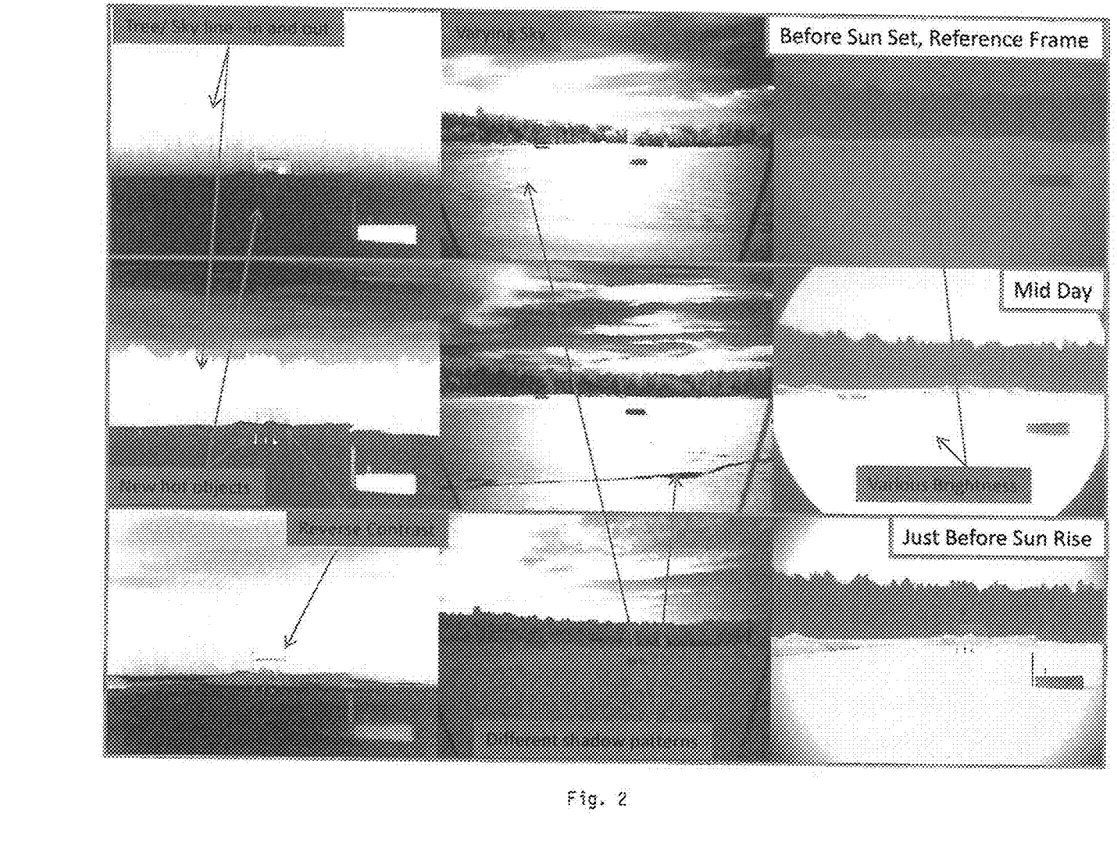

FIG. 2 is a blowup of the characteristics of FIG. 1. What is shown is that when objects come in and out of the field of view such as tree lines because of shading differences it does affect results. In the LWIR some things at different times of day become hotter or cooler or there are contrast reversals and the scene correlation is independent of since it is essentially a line drawing of the scene, as long as there are contrast differences which enable the generation of Sobels which is a line sketch of the drawing which then can be correlated to the previous image taken earlier in the day.

Figure 3:
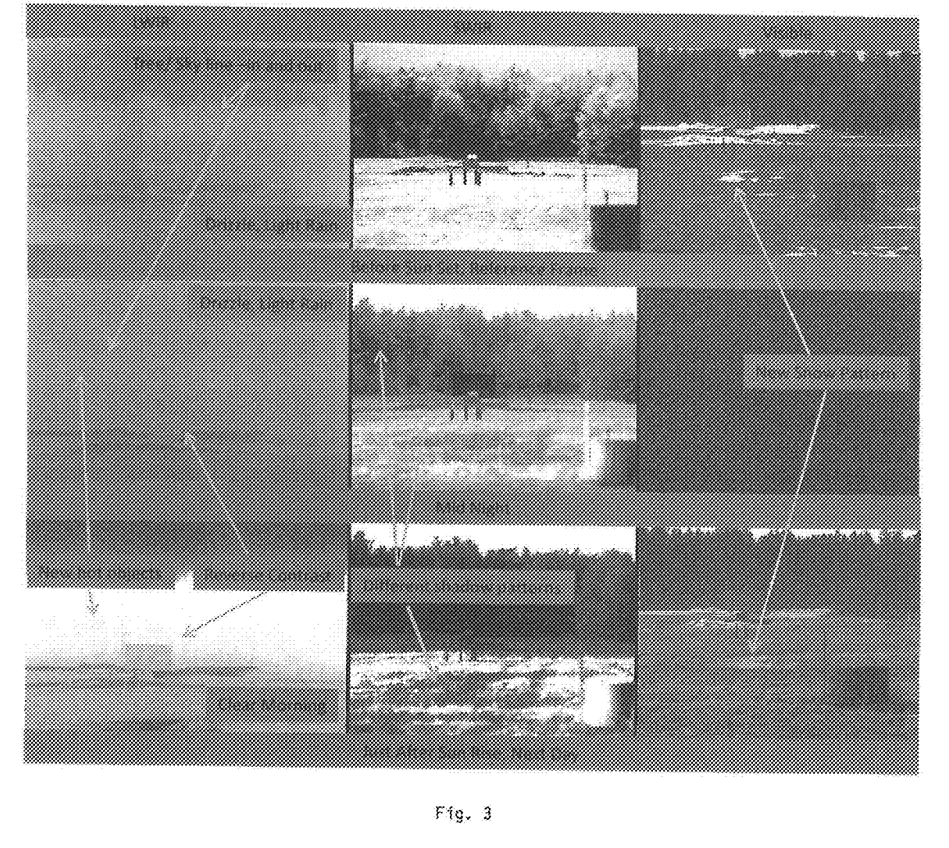

FIG. 3 is an extension of the data we took through some drizzle in terms of rain conditions in the field of view. As a result, the LWIR still held correlation until the heavy rains occurred. Consequently we demonstrated the process through heavy weather conditions and it was robust under such conditions. As long as there is a reasonable image we found that we could correlate the scene.

Figure 4:
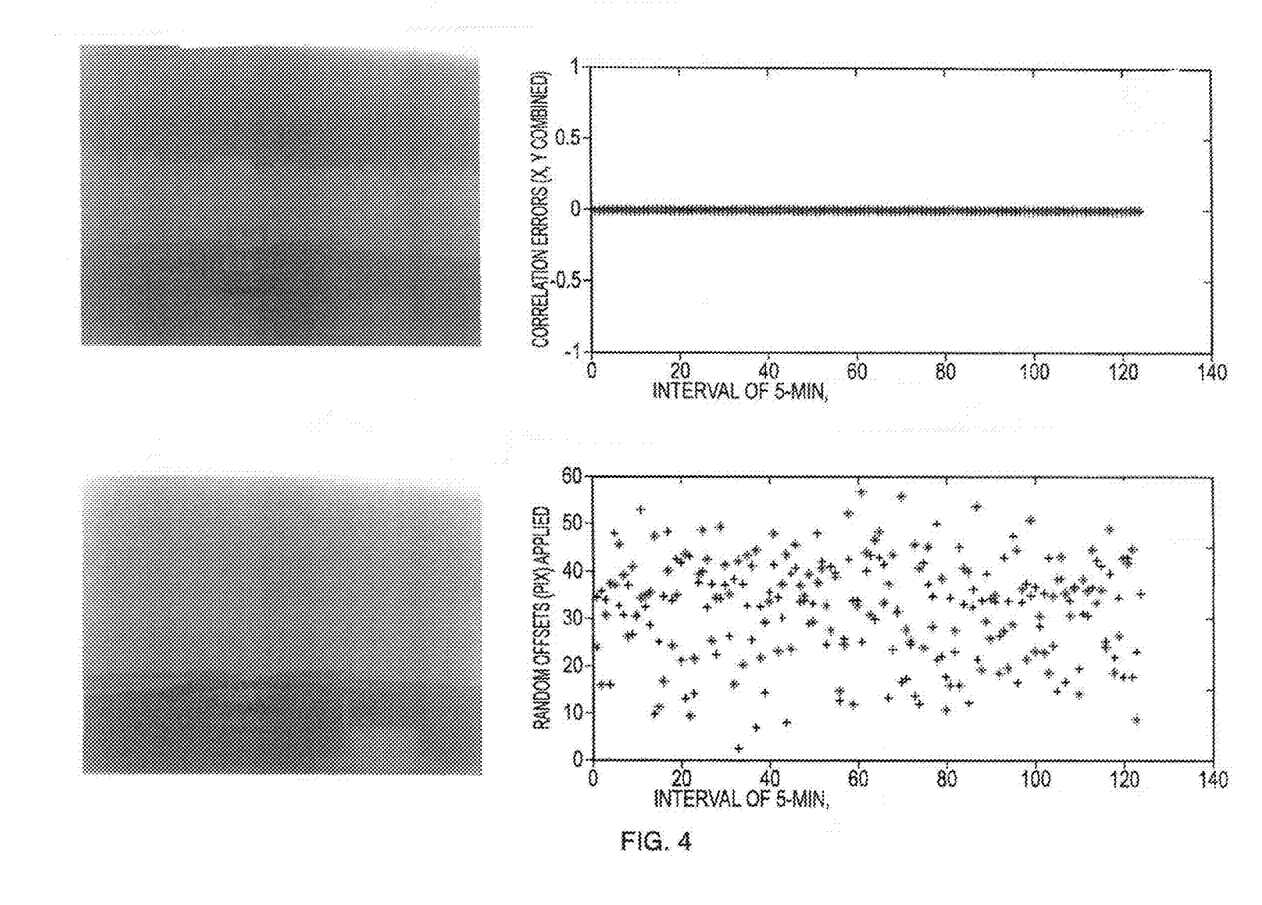

FIG. 4 shows specific LWIR data taken from 7 AM to 6:30 PM which is essentially a plot of performance. The lower plot represents data We took pictures every 15 minutes. The first set of pictures was used as a reference, and all the subsequent pictures thereafter were digitally moved relative to the center line of each of the camera pictures. The bottom plot shows the magnitude of the shift in the direction and then we re-correlated since we knew where zero was and what kind of error existed. The top plot represents zero error for a twelve hour period and is considered to represent excellent performance.

Figure 5:
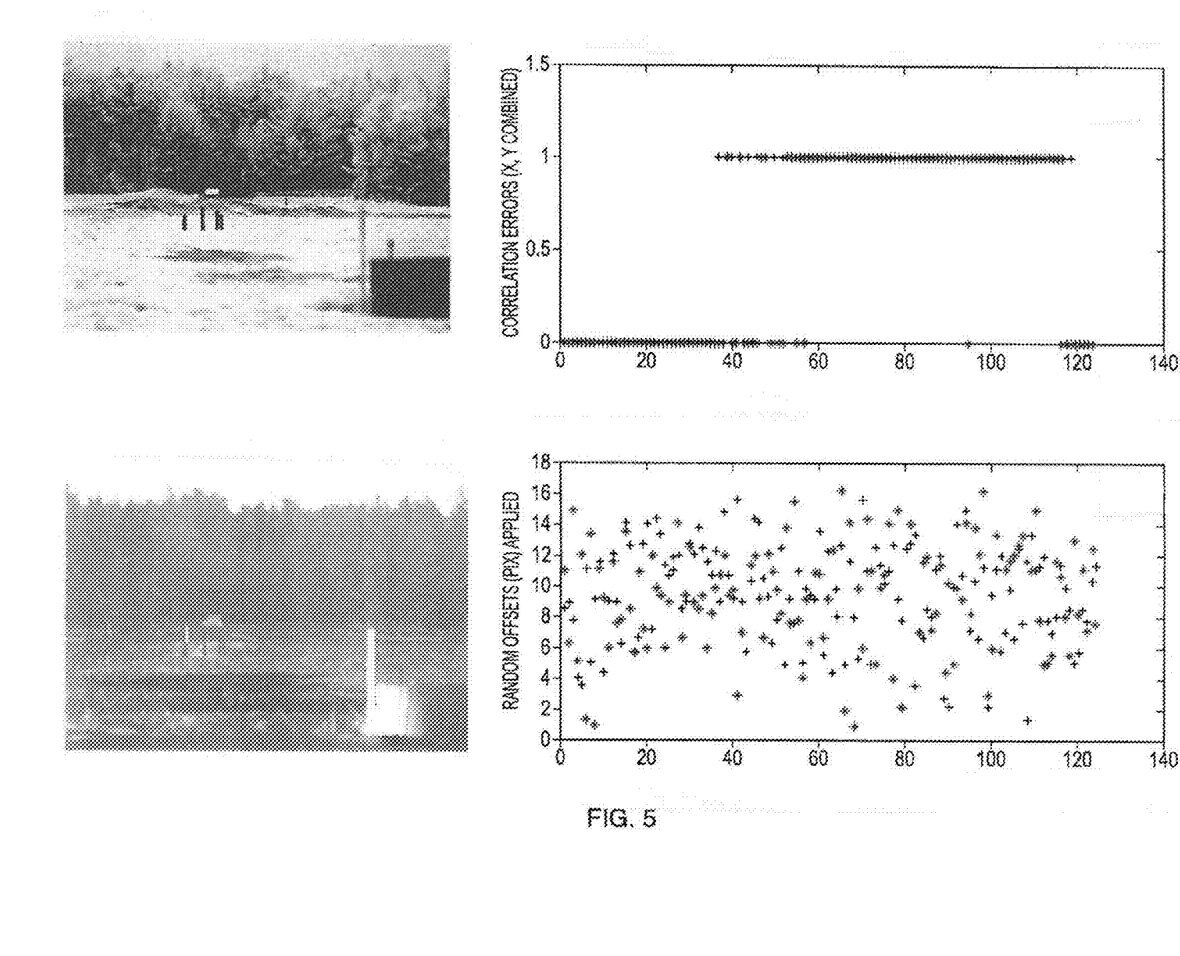

FIG. 5 is the same test as FIG. 4, again from 7 AM to 6:30 PM. The performance is still excellent as we basically held a pixel all day long.

Figure 6:
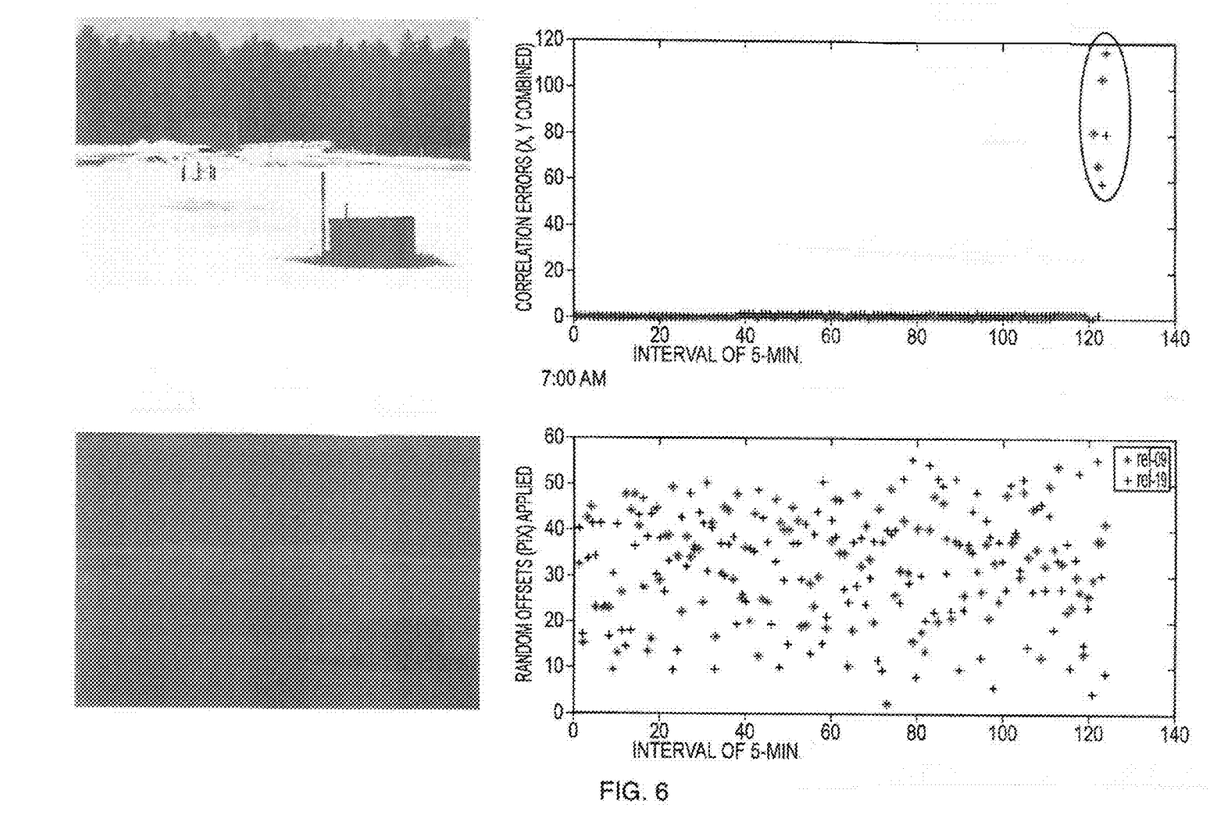

FIG. 6 is the same experiment this time with a visible camera for a twelve hour period which basically held performance all day long until the sun went down and the visible camera went dark.

Figure 7:
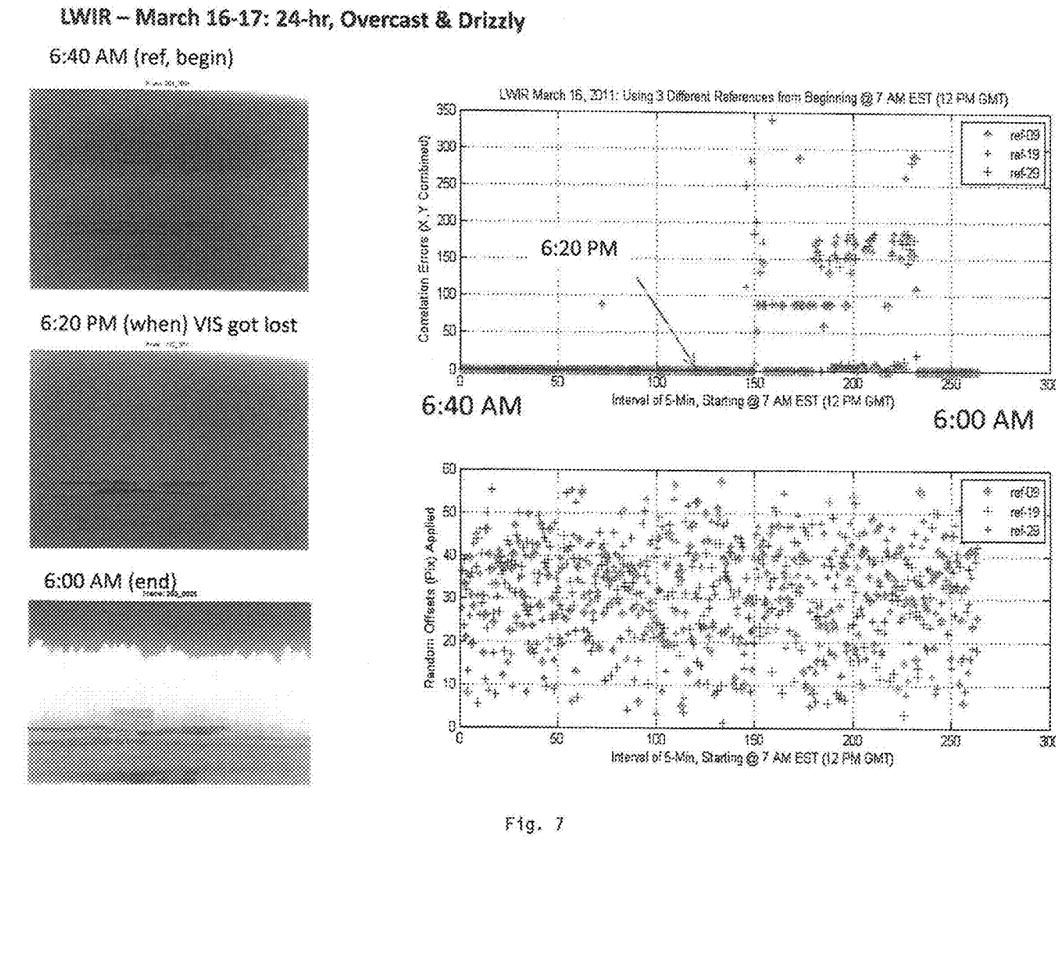

FIG. 7 is the actual data of the LWIR during a rainy day and held well throughout the day until heavy rains set in well past 11 PM.

Figure 8:
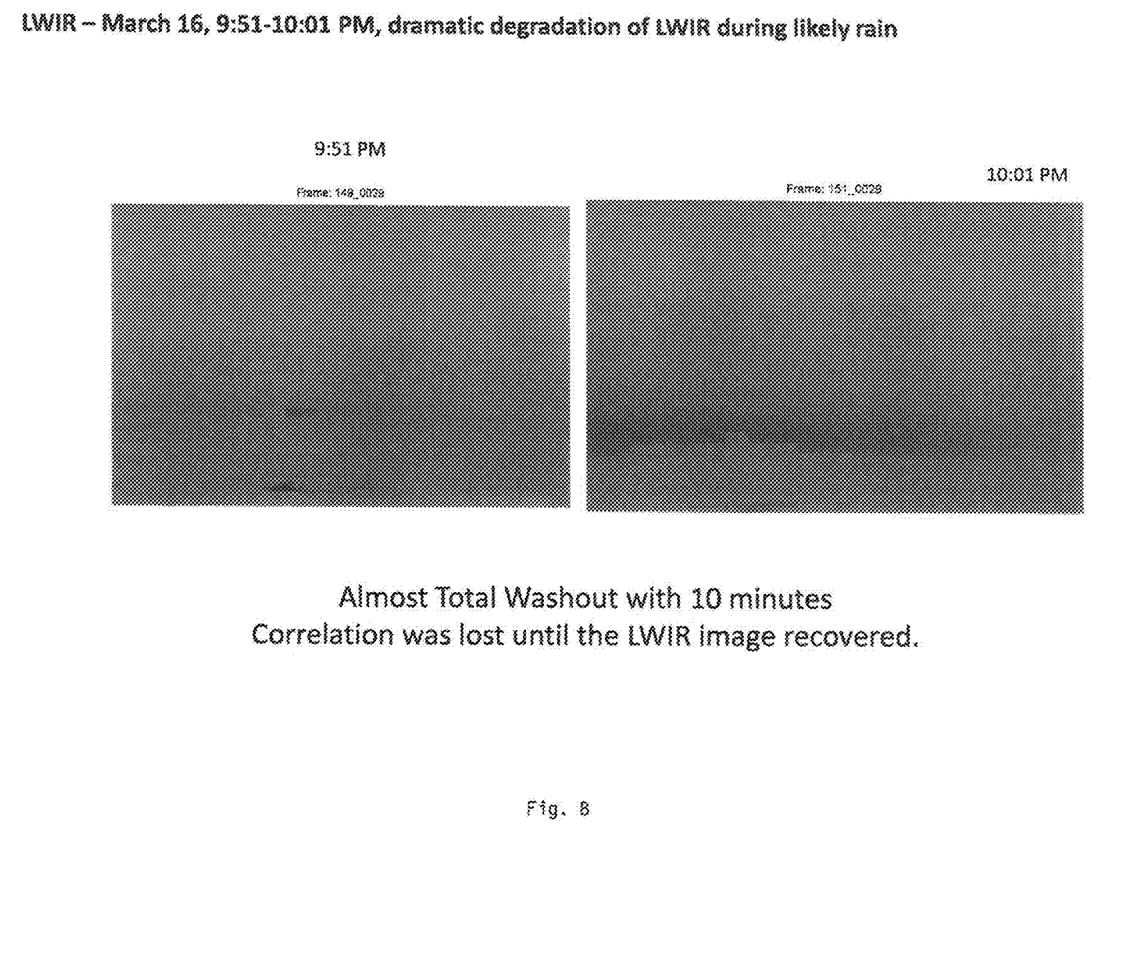

FIG. 8 is actually where we lost data and shows how the washed out image has to be before we lose registration.

Figure 9:
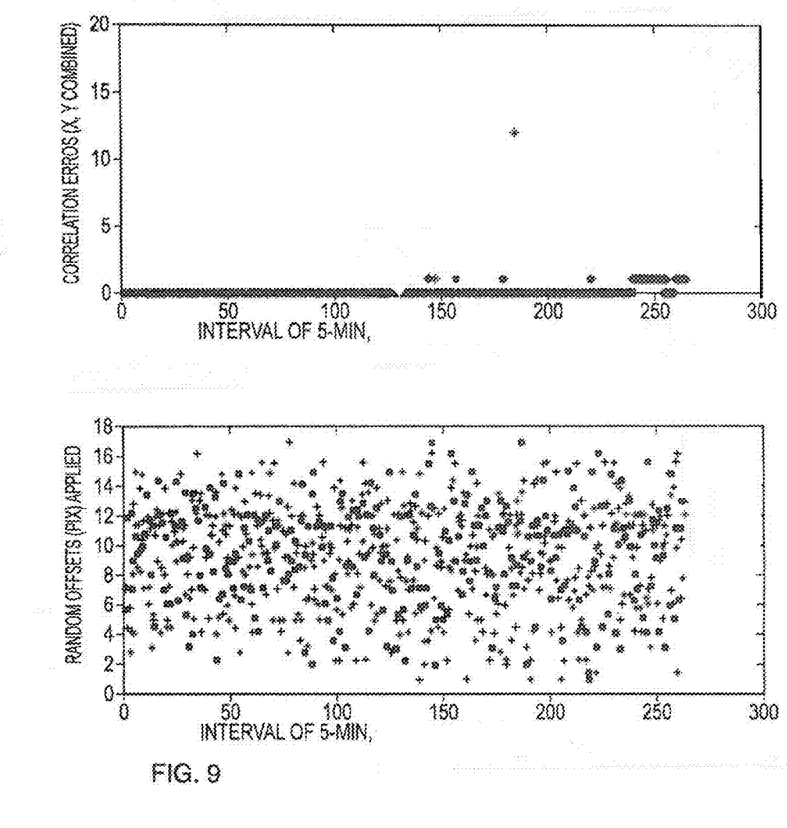

FIG. 9 is the SWIR camera during an overcast, drizzly day showing practically perfect performance all day long.

Figure 10:
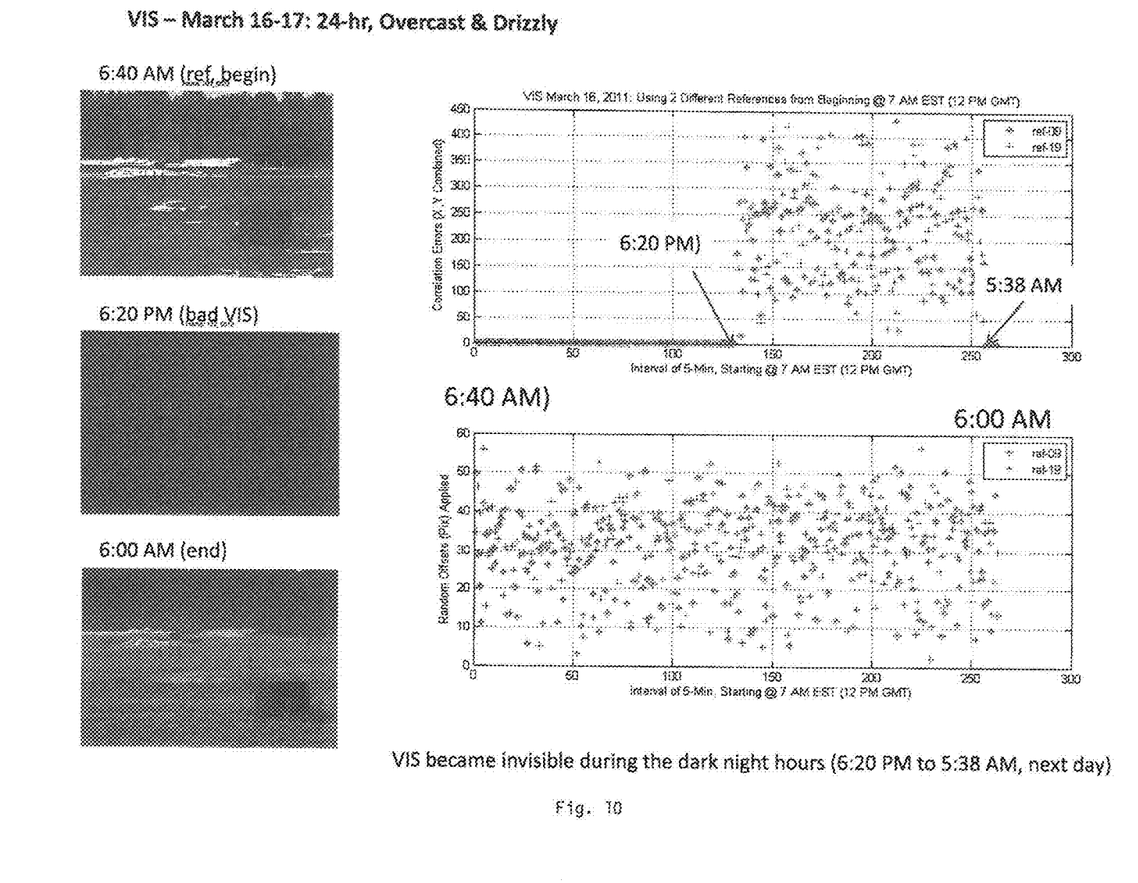

FIG. 10 is another test with the visible camera on an overcast, drizzly day showing very good performance all day long until the sun went down and the next morning we did recover back to the original imagery.

Figure 11:
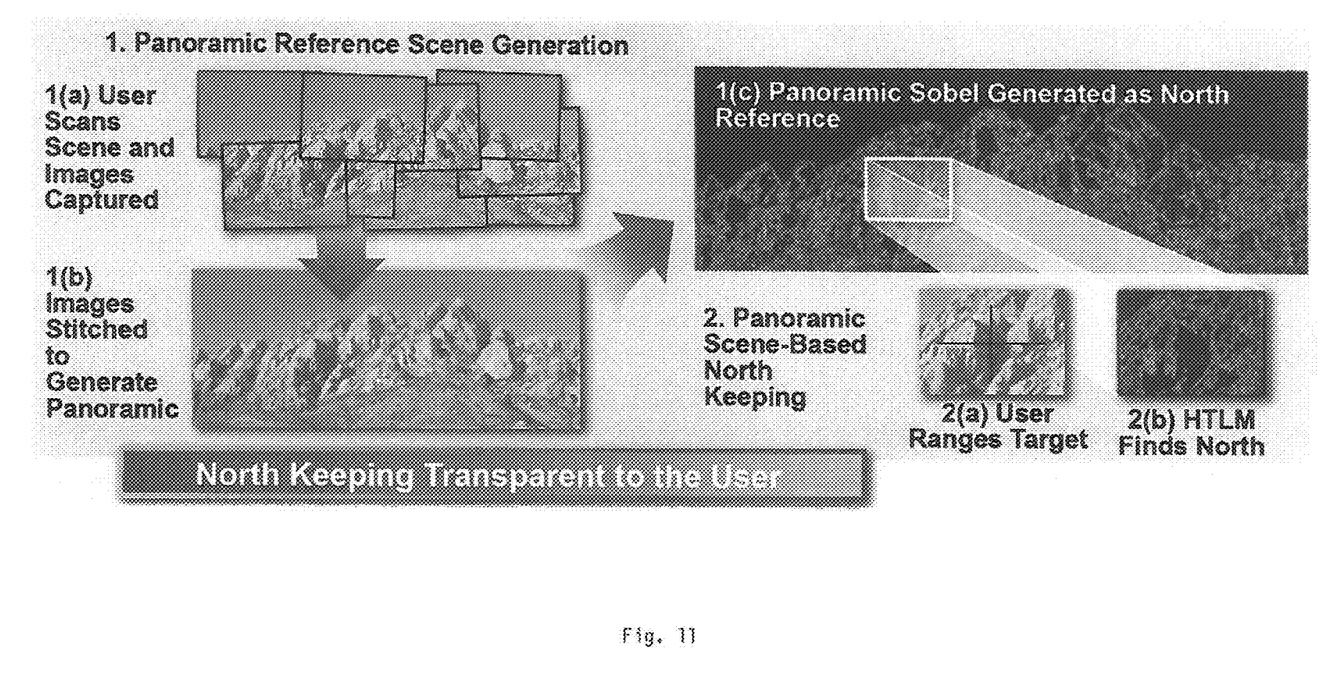

FIG. 11 shows that now that we have completed all the data in terms of how the system works. The way it is applied to the application is that a user shown in 1(*a*) will basically go out in an engagement area and scan his entire surrounding area, for example it could be a 10×40 degree field of view. The system will collect all those pictures and in 1(*b*) stitches them together into a global panoramic view of the engagement area. From that point we generate a Sobel which goes from 1(*a*) to 1(*c*), and what is stored in memory is actually the Sobel of the panoramic view. Later in the day, the user finds a target and takes a picture of the target with the crosshairs on the target. At this point the user can then take a Sobel of that image which we compare to the master on 1(*c*) and we finds its location. Since we know how the Sobel panoramic view is relative to the north vector we can now know the exact direction of the target using scene correlation.

Figure 12:
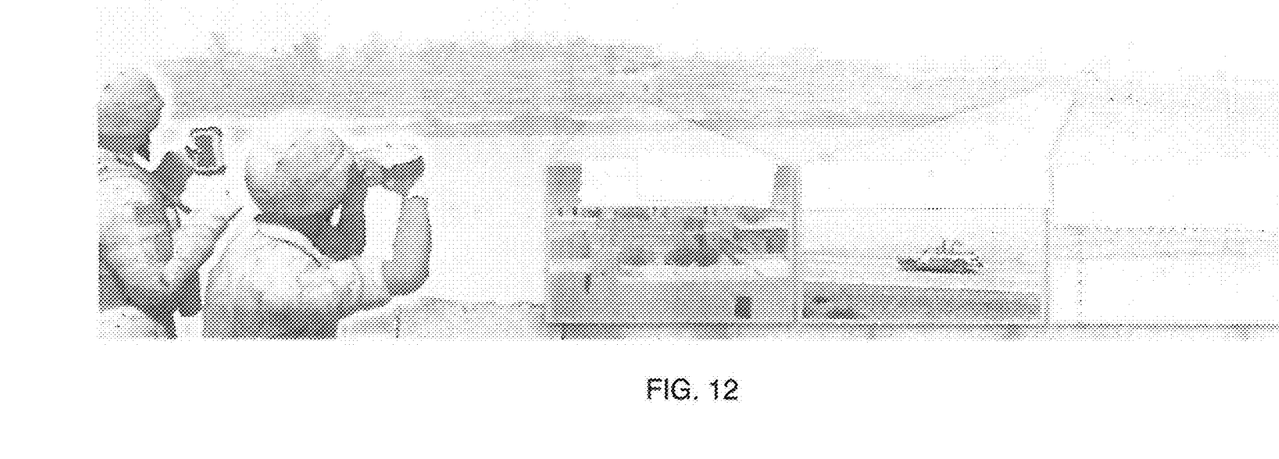

FIG. 12 explains the single picture approach. It will be understood that the Hand-held Targeting Location Module (HTLM), which contains a processor, computes precision delta azimuth.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for maintaining north using a processing unit comprising the steps of:

locating north with a north finding gyroscope;

tying north to a feature in a scene through imagery to generate a reference image;

correlating the feature to a target in the field of regard of a plurality of cameras; and using long wave infrared (LWIR) and short wave infrared (SWIR) radiation, determining a north vector and translating the north vector into a target vector relative to north.

* * * * *